United States Patent [19]

Solé et al.

[11] Patent Number: 4,500,361

[45] Date of Patent: Feb. 19, 1985

[54] PROCESS FOR THE PREPARATION OF TREATED LEAD CHROMATE BASED PIGMENTS

[75] Inventors: Carlos M. Solé; Juan A. Vallvey, both of Barcelona, Spain

[73] Assignee: Colores Hispania, S.A., Spain

[21] Appl. No.: 489,297

[22] Filed: Apr. 28, 1983

[51] Int. Cl.³ .......................... C04B 31/02; C08K 3/00
[52] U.S. Cl. ............................... 106/298; 106/308 B; 106/309
[58] Field of Search ..................... 106/309, 298, 308 B

[56] References Cited

U.S. PATENT DOCUMENTS

| | | | |
|---|---|---|---|
| 2,212,917 | 8/1940 | Horning | 106/298 |
| 2,316,244 | 4/1943 | Huckle et al. | 106/298 |
| 2,365,171 | 12/1944 | Botti | 106/298 |
| 2,813,039 | 11/1957 | Bishop | 106/298 |
| 2,885,366 | 5/1959 | Iler | 106/300 |
| 3,656,986 | 4/1972 | Buckley et al. | 106/309 |
| 3,660,130 | 5/1972 | Buckley et al. | 106/309 |
| 3,929,500 | 12/1975 | Higgins | 106/308 B |
| 3,946,134 | 3/1976 | Sherman | 106/298 |
| 4,017,328 | 4/1977 | Higgins | 106/308 B |
| 4,046,588 | 9/1977 | Einerhand et al. | 106/308 B |
| 4,127,421 | 11/1978 | Ferrill | 106/309 |
| 4,235,639 | 11/1980 | Wilson | 106/308 B |

FOREIGN PATENT DOCUMENTS 630660  7/1931  Fed. Rep. of Germany .

OTHER PUBLICATIONS

L. Bock, Farben Zeitung 32, (1926), pp. 459-460.

*Primary Examiner*—Herbert S. Cockeram
*Attorney, Agent, or Firm*—Sughrue, Mion, Zinn, Macpeak, and Seas

[57] ABSTRACT

A process for the preparation of lead chromate based pigments comprising the steps of nucleation and growth and wherein:

(a) the lead ion is released by means of time and/or temperature conditions allowing the later precipitation of the lead ion absorbed or occluded in the crystal and the rearrangement of said crystal;

(b) the lead ion is precipitated by the addition of sodium or potassium salts;

(c) the crystal structure is prestabilized by reaction "in situ" of sodium silicate and an ammonium salt;

(d) the crystal is hot stabilized by the addition of hydrated oxides of a metal at two valency levels thereof;

(e) the crystal stabilization is consolidated by phosphorous salts.

14 Claims, No Drawings

PROCESS FOR THE PREPARATION OF TREATED LEAD CHROMATE BASED PIGMENTS

FIELD OF THE INVENTION

This invention relates to a process for the preparation of lead chromate pigments whereby there is improved the lightfastness, resistance to weathering, to sulphur dioxide, to sulphur releasing compounds (mercaptans and mercaptides, etc), to hydrochloric acid and to temperature of pigments having lead chromate as main component, without this improvement meaning a loss of shade beauty.

STATE OF THE ART

The pigments of reference herein are known commercially and generically as Chrome Yellows and Molybdenum Oranges. They are products formed essentially by: Lead chromate (Medium Chrome Yellow), basic lead chromate (Chrome Orange), lead sulphate, chromate (Lemon Chrome Yellow) and lead sulphate, chromate and at times phosphate (Primrose Chrome Yellow). The compounds formed by lead molybdo-sulpho-chromate constitute the Molybdenum Oranges, Scarlets and Reds. By extension, the pigments known as Chrome Greens and Phthalochrome Greens are also comprised under this invention as constituted by a mixture or co-precipitation of an appropriate Chrome Yellow with Prussian Blue or Phthalocyanine, respectively.

These pigments are formed by small crystals having a mean elementary size lying between 0.2 and 1.2 microns. The crystalline system is conditioned by the chemical composition and by the conditions (mechanical and physicochemical) of the precipitation process, which also determines the mean size, size distribution and habit of these particles. The precipitation process is not only the fact of forming an insoluble solid by interionic reactions in an aqueous solution, but it is also constituted by three stages, which are: nucleation, growth and ageing of the small crystalline particles. The formation of nuclei has to be controlled initially, since the birth of a large number thereof makes it impossible for them to grow, due to exhaustion of the dissolved product, whereas the formation of a low number of nuclei causes the crystals to grow exaggeratedly. During the growth stage, the appropriate size and shape of the particles is obtained by growth from the small particles (Ostwald ripening), by cementation or by conversion from a metastable stage to a structure thermodynamically more stable under the process conditions, such as is the case of the Molybdenum Oranges. In the ageing, the crystalline building is consolidated and at the same time it is purified of extraneous ions absorbed in its formation. The appropriate crystallographic properties, size distribution, shape and perfection of the elementary crystal affect both the optical and the chemical or photochemical behaviour of the pigment. Therefore, in this invention, not only the surface treatment and the products used, but also the form and conditions of precipitation establishing the crystalline properties are decisive.

When the group of pigments herein are well crystallised, they provide very good optical qualities, such as: limpid shades, high hiding power and adequate tinting strength for current technical needs. But, together with these qualities, they suffer from the drawback of blackening under the action of light, of being sensitive to reducing environments and to sulphur compounds, such as $SO_2$, and even lose their colour in moist environments for reduction of the chromate ion. Also, products releasing hydrogen sulphide or sulphides blacken them by formation of lead sulphide. In a 0.07 N hydrochloric acid medium at about 20° C., the sulpho-chromates release an amount of lead in excess of 7%. Their temperature resistance is also limited to 190° C., mainly among polymers and resins having a reducing behaviour during high temperature processing, such as polyvinyl chloride, polyethylene, polystyrene or epoxy polyamids, urea-formol, etc. Nevertheless, in comparison with their good pigmenting qualities, low oil absorption, easy dispersability and excellent gloss, these faults leave a positive balance, and technical evolution has been directed towards correcting the faults while aiming at retaining the good qualities.

Surface treatments, such being understood as first depositing and then covering the surface of the crystals with hydrated oxides of elements of groups 3, 4 and 5 of the Periodic Table, have been carried out since 1927.

L. Bock, Farben Ztg. 32, 459–460 (1926) was the first to report the addition of aluminium hydrate and aluminium phosphate to improve lightfastness. German Pat. No. 630,660 of 1936 claims the addition of Ti salts and Zn and Sn hydroxides. U.S. Pat. No. 2,212,917 of 1937 contemplates the addition of metals of the first Subgroup IV and Group V of the Periodic Table, namely, Ti, Zr, Hf, V, Nb, Ta, Sb and Bi, of which the one really applied is hydrated titanium oxide combined with aluminium hydrate. U.S. Pat. No. 2,365,171 of 1942 introduces the addition of hydrated rare earth oxides and shortly before the addition of trivalent antimony had been consolidated, see U.S. Pat. No. 2,316,244. 1947 saw the introduction of the precipitation of hydrated silica, alone or accompanied with other hydrated oxides, on the surface of pigment particles. U.S. Pat. No. 2,813,039 of 1953 teaches the addition of divalent manganese. The famous encapsulating of particles with "dense silica" date from 1956, U.S. Pat. No. 2,885,366. In spite of the fact that the "dense silica" represented a notable improvement over the conventional precipitation of flocculated silica, with a high oil absorption, large amounts of $SiO_2$ relative to the pigment weight are required to obtain a good level of protection. As from this time, there were obtained pigments having very good resistance to temperature and to chemical agents and since then about 130 patents have been published in about ten countries developing variations and combinations of the abovementioned inorganic stabilisers with organic surfactants and even encapsulation using "in situ" prepared polymers.

The pigments on the market have proved to have good fastness to sunlight, weathering and chemical agents, but certain deficiencies in the pigmenting properties, such as shade beauty, hiding power, gloss, etc., still subsist.

It may be observed that the necessary importance has not been given to the construction and consolidation of the crystalline building up to date, thereby leaving imperfections therein which act as more reactive sites or areas in which the photochemical reactions start deteriorating such fundamental aspects as shade beauty.

This invention provides a process for the formation and treatment of the pigment wherein, from the very outset, care is taken in the preparation of a crystal which is sufficiently well formed for the point defects on the surface or inside the crystal (excess electrons or positive holes) are minimal and, therefore, the remaining reaction sites may be easily blocked with the subsequent coating. Thus, therefore, the imperfections or lack of uniformity of the coating built up by deposition of hydrated oxides do not harm the protective efficiency, since with the crystal having few reactive defects, a sufficient amount of hydrated oxides will generally always be deposited.

DETAILED DESCRIPTION OF THE INVENTION

The invention relates to a process for the preparation of lead chromate based pigments wherein there are obtained products having a crystalline structure as close as possible to the ideal one. Thus Chrome Yellows are prepared in the Primrose, Lemon or Medium shades, have a monoclinic structure and the lead molybdo-sulpho-chromates are produced with a tetragonal structure. It is hard to stabilise a rhombic Primrose by this process. As far as possible, there should be avoided the intersticial defects, the areas of breakage or point defects (ion substitutions or deficiencies), since they are the weak points through which the aggressive external agents, such as sunlight radiation, weathering agents, sulphur dioxide, etc., may start their attack. In all cases, further to having a good crystal structure, the enveloping surface should be as spheroidal as possible, so that, apart from improving the optical qualities of the pigment, it allows the coating to be distributed conveniently for having the lowest possible number of sharp corners.

The nucleation, growth and ageing of the crystal has to be controlled and conducted in such a way that the particle size distribution should be the optimum one for each pigment. In fact, an excess of small particles (in spite of their being well crystallised) affords a large reaction surface and any failure therein is multiplied, the onset of harmful reactions being very likely, whereas with excessively large particles, the crystalline building thereof is much more labile and presents areas or planes of collapse easier to give way to the attack of aggressive agents.

Depending on the type of precipitated lead pigment, there are specific additives favouring the formation of a crystalline structure very close to the ideal one, which may be observed by X-ray diffraction or by scanning electron microscope (SEM) photography and also indirectly by their greater resistance to the aggressive agents of the atmosphere, sulphur dioxide, etc.

Several additives such as fluorides, chlorides, bromides and iodides of sodium, potassium and ammonium, as well as mixtures thereof, have been tested experimentally. It should be remembered that the lead ion forms complexes of the $(X_3Pb)Me$ and $(X_4Pb)Me_2$ with these ions and these products give up more slowly the lead entering to form the pigment crystalline particle and control the structure thereof. (X is halogen and Me is an alkali metal or ammonium ion.).

Each type of lead pigment to be precipitated has its optimum additive:

In the case of the lead sulphochromates, it has been found that, out of the above listed additives, the one favouring a good monoclinic crystallisation of these pigments is ammonium bifluoride, added as a small amount dissolved in the solutions prior to precipitation (See Examples 1 and 2). The results obtained relative to purity of shade, weather resistance and resistance to sulphur dioxide are always superior to the results of these same pigments without this additive.

In the case of the lead molibdo-sulpho-chromates having a tetragonal structure, the most appropriate additive is potassium chloride or sodium chloride, providing superior results of shade and tinting strength, resistance to weathering and sulphur dioxide than the same pigments without additive.

As is known, in the majority of these pigments, excess lead is used in the mother liquors. On the contrary, in the process of the invention, it is necessary to lower this lead excess almost to zero, so as: (a) to release the lead absorbed during the nucleation; (b) to separate the lead oxide or hydroxide from the pigment; (c) to avoid contamination of the waste waters; and (d) to make cost savings. Leaving absorbed lead may give rise to photochemical sensitization and the basic lead increments the lead soluble in 0.07 N hydrochloric acid.

The invention teaches the use of a sodium sulphochromate mixture to precipitate the excess lead in the same molar proportion as it is in the precipitation formula, since the already formed crystalline structure is then maintained, in the case of Lemon Chrome Yellow. For the same reason, it is of interest to use a sodium molybdo-sulpho-chromate mixture in the case of the molybdenum pigments.

According to this invention, the process of release of the lead absorbed in the crystal is conducted with heating and allowing sufficient time for the necessary reorganisation thereof. The fastness and resistance values cited herein are only obtained when the absorbed lead is released and a rearrangement of the microscopic crystals is allowed.

Once an adequate crystal has been formed, a coating is prepared by precipitation of Si and Sb oxides, with a final treatment with a mixture of zinc metaphosphate and phosphate. Although the deabsorption of the lead may be effected either with time or with heating, it is absolutely necessary to heat the precipitate before stabilisation. So as to avoid a change in structure during heating, it is also essential in this process to effect a precoating with silicon hydroxide (hydrated silica). To obtain this precoating, a solution of sodium silicate (50 g/l $SiO_2$) is added slowly over the colour paste such that the final pH lies between 7 and 9.5. The amount of hydrated silica deposited may lie between 0.5 and 1.5% by weight of the unstabilised pigment. Thereafter an ammonium salt which will lower the pH and will cause the precipitation of the silica is added extremely slowly. A further function of this precoating is to avoid the flocculation of the crystal particles during the heating and stabilisation process described hereinafter in greater detail.

According to the invention, the pigment paste is heated to about 70° C. to produce consolidation and insolubilisation of the hydrated oxides forming the true coating.

A very acid medium is normally used for stabilisation, lowering the pH at time to as low as 1.5. This means that the pigment surface suffers a partial attack or at least new point or interstitial defects are formed in the surface, through which the aggressive environmental agents have more reactive points or areas where they may start attacking the surface of the pigment's crystalline structure. Under these conditions, it is very hard for the hydrated oxide and metal salt coating to provide an effective protection, since it is not possible to ensure a homogenous and uniformly distributed encapsulation over the crystalline particle. Therefore, it is extremely important not to alter the crystalline building, albeit on the surface only, with treatments requiring operation in strongly acid media.

According to the invention, the stabilising agents are added very slowly to a vigorously stirred pigment paste, but while the pH of the latter is held to the range of 5 to 9, by a closely controlled addition of an alkaline solution. A 20–40 g/l sodium carbonate solution is appropriate. Then each portion of (highly acid) stabilising solution is almost neutralised on contacting the pigment paste and quickly precipitates the metal in hydroxide form, but embracing the pigment particles in the area of fall. If the stirring is vigorous and the pouring is slow, at the end of the addition of all the stabilising solution, the cation hydroxide will have encapsulated practically all the pigment paste particles.

According to the invention, further to the silica coating, there is also used the action of hydrated oxides of antimony in two valency states, trivalent and pentavalent, which allows the admittance of electrons or the filling of positive holes depending on the type of point faults in the crystal. It has been observed that if zinc or cadmium hexametaphosphate is used alone, a very good level of stabilisation is attained, but the pigment gloss is considerably reduced. If only zinc or cadmium phosphate is used, the stabilising action is not so effective, but the pigment gloss after dispersion is not affected. In this invention, a compromise is reached by using a mixture of equal parts of hexametaphosphate and phosphate.

In this invention, advantage is taken of the synergetic effect obtained with the combination of the different stabilisers used in the order and way detailed in the Examples. Thus, the combination of the precipitated hydrated silica in the prestabilisation, together with the posterior addition, after heating the pigment suspension to 70° C., of further hydrated silica precipitated with ammonium salt and the use of antimony salts in two valency states (trivalent and pentavalent) and finally the simultaneous addition of sodium phosphate and hexametaphosphate to precipitate them with Zn or Cd as required, gives rise to the established protection. This may be shown by effecting stabilisations in which these compounds are deleted or the order and way of adding them is altered; the protection obtained may be good in certain aspects, but it is not overall as the preferred form. Thus, if the pouring order of the silica is altered or this is deleted in part or in all, the full shade of the yellow pigment is dirtied. The suppression of a valency level of the antimony oxide produces pigments having more than 5% lead soluble in 0.07 N hydrochloric acid. Also the suppression of the zinc and/or cadmium phosphate and hexametaphosphate or changes in the addition thereof produce lower levels of resistance to $SO_2$, temperature and light, which qualities are only recovered when operating with the combination and proportions of stabilisers as described. To sum up, the synergetic effect obtained with the different stabilisers produces pigments with optimum resistance values.

The object of the invention is a process for the preparation of lead chromate based pigments comprising the steps of nucleation and growth and characterised essentially in that:
(a) the pigment crystals are aged, with release of the excess lead ion absorbed or occluded in the crystal interior during the nucleation step;
(b) the excess lead ion is precipitated out;
(c) the crystals are prestabilised with silicon hydroxide (hydrated silica); and
(d) the crystals are stabilised.

One feature is that the release of the lead ion is effected under time and/or temperature conditions allowing the later precipitation of the lead ion absorbed or occluded in the crystal and the rearrangement of the crystal.

A further feature lies in that the precipitation of the excess lead ion is effected with the addition of sodium or potassium salts, preferably sodium sulphates and chromates for the Chrome Yellows and sodium molybdo-sulpho-chromates for the Molybdenum Oranges.

A further feature is that the prestabilisation of the crystal structure is effected by "in situ" reaction of sodium silicate and an ammonium salt.

A further feature is that the hot stabilisation of the crystal is effected with the addition of hydrated oxides of a metal at two valency states, preferably trivalent and pentavalent antimony.

Yet a further, particularly interesting feature is that the stabilisation is effected by taking advantage of the marked synergetic effect of the following compounds: silicon hydroxide (hydrated silica), metal oxides with two valency states and phosphorous salts.

The invention also comprises a pigment having crystals coated by the association of compounds of the group comprising silicon hydroxide (hydrated silica), antimony oxides having three and five valencies and the zinc or cadmium phosphates and metaphosphates.

The invention also includes a coloured material formed by a mass of a natural product, artificial or synthetic product, alone or in combination, wherein there is included a pigment prepared according to any of the above ways.

The examples given below provide a more precise way of the operative process, but they are in no way limitative since they are applicable to the whole range of pigments described herein.

EXAMPLE 1

421 g of lead nitrate, diluted to 3,500 cc were placed in a 10 liter reaction vessel.

114 g of sodium dichromate dihyrate, 36 g of sodium hydroxide, 38.5 g of sodium sulphate and from 0.5 to 5% of ammonium biflouride on the weight of total pigment formed were weighed out and diluted to 3,500 cc.

This latter solution was added to the one already in the reactor with stirring over a period of 20–30 min. The mother liquors contained excess lead.

The mixture was allowed to stand unstirred for 2 days, whereby the lead ion was deabsorbed and this was confirmed by analysis because the excess in the mother liquors increased. Thereafter sodium sulpho-chromate was added (in the same mole ratio as in the precipitation formula) until the excess was approximately 1.5 g/l. The mixture was allowed to stand for a further 2 days, unstirred, whereby more lead ion was deabsorbed, the total being determined again by analysis and thereafter it was lowered almost to zero by a further addition of sodium sulpho-chromate (in the same mole ratio as in the precipitation formula). In this way there were produced about 400 g of precipitate in optimum conditions for good stabilisation. Since it was necessary to apply heat in order to stabilise, a precoating was effected with hydrated $SiO_2$, by slowly adding 21.4 g of 28% $SiO_2$ sodium silicate, diluted to 120 cc over the well stirred pigment paste, the pH being about 9. Thereafter, 45 g ammonium sulphate (or other ammonium salt) diluted to 250 cc were added over 1 hour.

The mixture was heated to 70° C. and 25.7 g of 28% $SiO_2$ sodium silicate, diluted to 200 cc, were added slowly over the well stirred pigment paste, the pH being around 9. Thereafter there were added 75 g of ammonium sulphate (or other ammonium salt), diluted to 400 cc, in a period of 1 hour.

From 0.5 to 4.5% $Sb_2O_5$ (in soluble form, obtained by a balanced mixture of chlorides and fluorides) was added over 30 minutes, holding the pH always between 5 and 9.

From 1 to 7% $Sb_2O_3$ (in soluble form, obtained by a balanced mixture of chlorides and fluorides) was added over 30 minutes, holding the pH between 5 and 9. At the end of this operation, the pH was adjusted to 7.

Thereafter there was precipitated "in situ" from 2 to 10% of a mixture of zinc phosphate and zinc hexametaphosphate (1:1), adding the component ions slowly over a total time of 1 hour and holding the pH between 5 and 9. Finally the mixture was adjusted to pH 7, was filtered, washed to remove soluble salts and was dried at 100° C.

The pigment treated in this way was of the Lemon Yellow type, with a resistance to sulphur dioxide of more than 6 strong cycles according to the Kesternich test (DIN 50,018), with a good weathering strength, with a content of lead soluble in 0.07 HCl of less than 5% (B.S. 3900, Part B: 3: 1965), without blackening when formulating this pigment with PVC with mercaptide type stabilisers and a shade as clean as that of a conventional Lemon Yellow pigment.

EXAMPLE 2

Exactly the same process as Example 1 was followed, except that the 2–10% of a mixture of zinc phosphate and zinc hexametaphosphate (1:1) was replaced by 2–10% of a mixture of cadmium phosphate and cadmium hexametaphosphate. The pigment treated in this way had properties similar to those of the Example 1 pigment, the shade also being clean, but slightly different.

EXAMPLE 3

689 g of lead nitrate diluted to 3,000 cc were placed in a 10 liter reaction vessel.

300 g of sodium dichromate dihyrate and 84.6 g of sodium hydroxide were weighed out and diluted to 3,000 cc.

This latter solution was added to the solution in the reactor with stirring over a period of 60 minutes. The mother liquors contained 1 g/l excess of sodium dichromate and the pH was between 8.4 and 8.6.

The mixture was heated at 90° C. for 1 hour with stirring.

It was allowed to stand unstirred for 2 days. The mother liquors were syphoned off and the same volume was replaced, whereby the excess of chromate ion was considerably reduced. In spite of this, the lead ion required for the mother liquors to have a slight excess thereof was added.

This provided about 620 g of Medium Yellow precipitate, in optimum conditions for being stabilised.

Precoating and stabilisation the same as in Example 1 was effected, but with the variation that the zinc phosphate and zinc hexametaphosphate mixture precipitated "in situ" was 6–14%.

EXAMPLE 4

A Medium Yellow was precipitated as in Example 3, with a precoating and stabilisation the same as in Example 3, but replacing the 6–14% of the zinc phosphate and zinc hexametaphosphate with a mixture of cadmium phosphate and cadmium hexametaphosphate.

EXAMPLE 5

235 g of lead nitrate were diluted to 3,000 cc.

85 g of sodium dichromate dihydrate, 12.5 g of sodium molybdate, 5.4 g of sodium sulphate, 21.1 g of sodium hydroxide and 1–15% of potassium chloride over the weight of total pigment formed were weighed out and diluted to 3,000 cc, the pH being adjusted to 10.

The 2 solutions were poured simultaneously into a 10 liter reactor of appropriate shape (tapered cylinder) with vigorous stirring over a period of 5 minutes, but in such a way that the mother liquors always had a 1 g/excess of lead ion and pH 3.5 to 4.0.

The mixture was stirred for 30 minutes, after which sufficient sodium molybdo-sulpho-chromate (in the same mole ratio as in the precipitation form) was added for the excess lead ion in the mother liquors to drop practically to zero.

The result was about 230 g of precipitate ready for stabilisation.

In this case 32.8 g of 28% $SiO_2$ sodium silicate diluted to 190 cc was quickly added over the well stirred pigment paste, holding the pH to 9.5 at the most.

Thereafter 108 g of ammonium sulphate (or other ammonium salt), diluted to 600 cc, were added over a period of 10 minutes. Thereafter the mixture was stirred for about 30 minutes.

The mixture was heated to about 40° C. and the pH was adjusted to 7.

From 0.5 to 4% of $Sb_2O_5$ (in soluble form, obtained by a balanced mixture of chlorides and fluorides) was added over 30 minutes, holding the pH always to between 5 and 9.

From 1 to 7% of $Sb_2O_3$ (in soluble form, obtained also by a balanced mixture of chlorides and fluorides) was added over 30 minutes, holding the pH to between 5 and 9. At the end of the operation, the pH was adjusted to 7.

Thereafter from 2 to 10% of a mixture of zinc phosphate and zinc hexametaphosphate (1:1) was precipitated "in situ", holding the pH to within the range of 5 to 9.

Finally the pH was adjusted to 7, the mixture was filtered, washed to remove soluble salts and dried at 80° C.

The pigment treated in this way was the Molybdenum Orange type and had very good properties, like those described in Example 1.

EXAMPLE 6

A molybdenum Orange was precipitated as in Example 5 and with a precoating and stabilisation as in Example 5, but replacing the 2–10% of a mixture of zinc phosphate and zinc hexametaphosphate by 2–10% of a mixture of cadmium phosphate and cadmium hexametaphosphate.

What we claim is:

1. In a process for preparing crystalline lead chromate-based pigments by precipitation from lead nitrate and sodium dichromate, the improvements comprising:

(a) aging the precipitated pigment crystals to allow release of the lead ions by means of time and/or temperature conditions to allow the later precipitation of the lead ions absorbed or occluded in the crystal and rearranging of the crystals;

(b) precipitating excess lead ion with sodium or potassium salts;

(c) treating the pigment crystals with silicon hydroxide;

(d) coating the crystals with hydrated oxides of a metal at two valency levels thereof; and (e) treating the crystals with phosphorous salts.

2. The process of claim 1, wherein the precipitation of the lead ion in the Chrome Yellows is effected by the addition of sodium sulphate and chromate in the same mole ratio as in the initial pigment precipitation.

3. The process of claim 1, wherein the precipitation of the lead ion in the Molybdenum Oranges is effected by the addition of sodium molybdo-sulpho-chromate in the same mole ratio as in the initial pigment precipitation.

4. The process of claim 1, wherein the stabilisation is effected by addition of the following compounds: silicon hydroxide, metal oxides at two valency levels thereof and phosphorous salts.

5. The process of claim 4, wherein the metal having two valency levels is antimony with valencies of three and five.

6. The process of claim 5, wherein trivalent and pentavalent antimony oxides are used in amounts of from 0.5 to 7% of the unstabilised pigment.

7. The process of claim 1, wherein the phosphorous salts are zinc phosphate and hexametaphosphate.

8. The process of claim 1, wherein the phosphorous salts are cadmium phosphate and hexametaphosphate.

9. The process of claim 7, wherein the weight ratio of the zinc phosphate and hexametaphosphate is 1:1 and the amount used lies between 2 and 25% of the unstabilised pigment.

10. The process of claim 8, wherein the weight ratio of the cadmium phosphate and hexametaphosphate is 1:1 and the amount used lies between 2 and 25% of the unstabilised pigment.

11. The process of claim 1, wherein the stabilisation is effected at a pH close to $7\pm2$, with the slow addition of the reactants, vigorous stirring and high dilution of the stabilisers.

12. The process of claim 1, wherein the pigment is stabilised with heating, at temperatures of from 60° to 85° C. for Chrome Yellow.

13. The process of claim 1, wherein the pigment is stabilised with heating, at temperatures of from 30° to 50° C. for Molybdenum Orange.

14. Pigment prepared according to the process of claim 1, wherein the cyrstals are treated sequentially with compounds comprising silicon hydroxide, trivalent and pentavalent antimony oxides and zinc or cadmium phosphate or hexametaphosphate.

* * * * *